United States Patent [19]

Föll, Eberhard et al.

[11] Patent Number: 4,922,405

[45] Date of Patent: May 1, 1990

[54] HIGH VOLTAGE TRANSFORMER

[75] Inventors: Föll, Eberhard, Nehren; Gustav Guth; Joachim Guth, both of Salach; Peter Holl, Tübingen; Alexander van Raaij, Tübingen, all of Fed. Rep. of Germany

[73] Assignee: Polymer-Physik GmbH & Co. KG, Lemforde, Fed. Rep. of Germany

[21] Appl. No.: 525,391

[22] Filed: Aug. 22, 1983

[30] Foreign Application Priority Data

Aug. 21, 1982 [DE] Fed. Rep. of Germany ....... 3231166

[51] Int. Cl.5 .............................................. H02M 7/00
[52] U.S. Cl. ..................................... 363/126; 336/155
[58] Field of Search ........................... 363/84, 90, 126; 336/155, 184, 212

[56] References Cited

U.S. PATENT DOCUMENTS 3,631,534 12/1971 Hirota et al. ........................ 336/184
4,259,716 3/1981 Harris et al. ........................ 336/155
4,357,587 11/1982 Philberth et al. ................... 336/212

OTHER PUBLICATIONS

"Hochspannungsanlagen zum Betrieb von Elektronenkanonen", by Schroller, Jessat and Vetters (pp. 20–31), 6/1986.

Primary Examiner—Patrick R. Salce
Attorney, Agent, or Firm—Stevens, Davis, Miller & Mosher

[57] ABSTRACT

The present invention provides a high voltage transformer consisting essentially of a magnetic iron core, yokes and primary and secondary coils, with high voltage rectifier and fine control element for the energy supply of single and multistage electron accelerators, wherein the primary coil is such a distance from the secondary coil that a large stray field results, the ratios of yoke to limb lengths being from 1:1 to 2:1.

4 Claims, 2 Drawing Sheets

HIGH VOLTAGE TRANSFORMER

BACKGROUND OF THE INVENTION

1. Field of the Invention

The present invention is concerned with a high voltage transformer consisting essentially of a magnetic iron core, yokes and primary and secondary coils, with high voltage rectifier and fine control element for the energy supply of single and multi-stage electron accelerators.

2. Discussion of Prior Art

The use of electron streams as energy carriers of high capacity and power density is of ever greater importance in various industrial fields.

The field of electroheat is thereby widened and enriched by new working principles and processes. Besides electron stream welding, melting, annealing and vaporisation, the chemical cross-linking of synthetic resins, as well as the drying and hardening of lacquers by means of accelerated electrons is today an especially cost-favourable and environmentally satisfactory process.

A prerequisite for the industrial use of electron stream technology is the availability of strong and operationally safe electron guns, as well as of the sources of high voltage necessary for the operation thereof and of auxiliary devices therefor.

Since, in the case of lacquer hardening, subsequent cross-linking of lacquers, film cross-linking, laminating or cross-linking of pressure-sensitive adhesives, it is a question of relatively thin layers in the range of from 1 to 300 $\mu$m., as electron accelerators there are available so-called one-stage accelerator systems. They can be operated with voltages of up to about 300 keV and, in their construction, are, in comparison with multistage systems, simple and inexpensive. Higher acceleration voltages are of less interest for a wide industrial use in surface and foil technologies for reasons of cost and for reasons of the more expensive shielding against the harder X-rays resulting in the case of braking the electrons.

Electron stream producers of up to 300 keV accelerating voltage can still be screened with lead sheets and thus are not restricted to use in fixedly installed concrete bunkers.

The energy supply for electron accelerators consists of a high voltage device. It provides the acceleration voltage for the electron stream and thus imparts to it its energy. Such a device includes a series of auxiliary devices for measurement, control and regulatory functions, as well as protective and monitoring devices.

Since the present invention is only concerned with the high voltage supply, cathode heating, voltage supply for the control electrodes and for the stream guiding system are not explained in more detail.

As can be seen from the Figure of the accompanying drawing, the high voltage supply comprises the following important features (see, in this regard, also Schroller, Jessat, Vetters, "Hochspannungsanlagen zum Betrieb von Elektronenkanonen, LEW-Nachrichten 1976, Communications from the Forschungsinstitut Manfred von Ardenne, Dresden): fine control element, high voltage transformer and high voltage rectifier.

In the case of high voltage supplies with relatively high acceleration voltages, as fine control elements there are used variable-ratio transformers since they offer the greatest possible safety in the case of surges which occur. Impedances for limiting the short circuit current can also be introduced on the primary side into the current supply. Electronic short circuit suppressors have not proved to be useful in the case of voltages of 300 keV.

The above-described embodiment has the following disadvantages:

The impedances used for limiting the short circuit current must, for reasons of capacity, consist of large-volume coils of low inductivity and, for this reason, offer only insufficient protection for the starting up of an electron accelerator which, after every comparatively great operational interruption, must again be newly activated. Therefore, in the case of the hitherto known devices of the higher voltage class, these impedances must be omitted. Consequently, in the case of spark-overs during the bringing into operation of the stream producer and also during the operation thereof, enormous discharges occur in the stream producer which are further potentiated by the energy subsequently supplied from the primary power supply. Furthermore, in the case of the conventional manner of construction of high voltage transformers, the primary and secondary coils are so constructed that there results a coupling coefficient which is as high as possible in order to be able to operate with as little loss as possible. This construction additionally supports the discharge current in the case of a high voltage spark-over. These discharges can lead to the destruction of the secondary coils or of the rectifier in the high voltage apparatus, in spite of the barrier resistance on the consuming device.

SUMMARY OF THE INVENTION

Therefore, it is an object of the present invention to provide a high voltage transformer for the supply of an electron stream producer which, by appropriate construction of the transformers and of their circuitry, in the case of spark-overs, reacts by an interruption of the voltage and thus extinction of the spark-over, without switching off or destruction of the transformer or rectifier.

Thus, according to the present invention, there provided a high voltage transformer consisting essentially of a magnetic iron core yokes and comprised of limbs, and primary and secondary coils, with high voltage rectifier and fine control element for the energy supply of single and multistage electron accelerators, wherein the primary coil is such a distance from the secondary coil that a large stray field results, the ratios of yoke length x to limb length y being from 1:1 to 2:1.

DETAILED DESCRIPTION OF PREFERRED EMBODIMENTS

Figure 1:
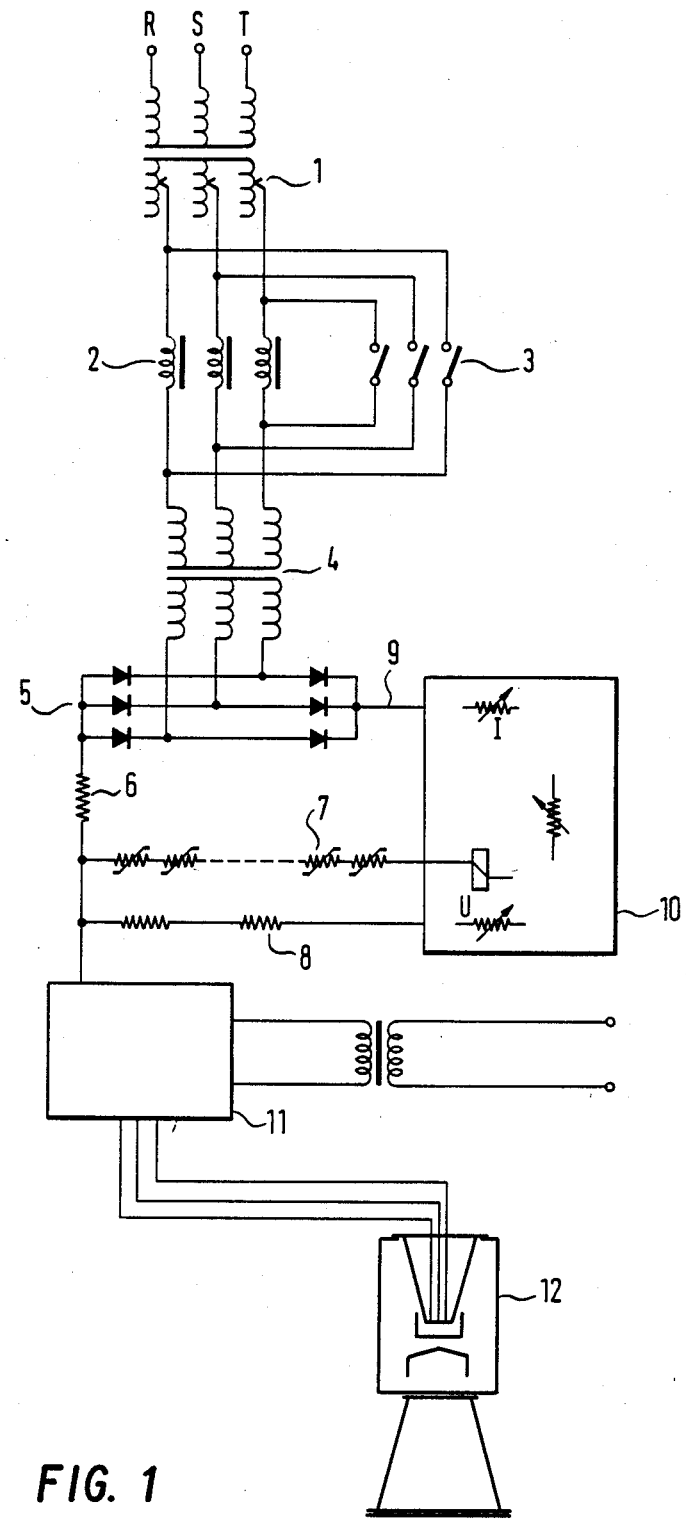
FIG. 1 is an electrical schematic illustrating the connection of the present invention.

In the case of the high voltage transformer 4 shown in FIG. 1 according to the present invention, the primary and secondary coils, separated from one another, are admittedly on the same leg of the iron core of the transformer but are spatially so separated from one another that a large stray field results so that, in the case of high voltage spark-overs, the magnetic resistance increases very quickly and an increased subsequent energy supply in the secondary circuit is interrupted.

This "softening" effect can be still further increased by the greatest possible distance of the secondary coil from the iron core 20 of the transformer.

Thus, in principle, the arrangement of the coils on the core, as well as the iron path length between the primary P and secondary S coil and the iron path lengths of the yokes, are responsible for the "softening" of a high voltage transformer.

Figure 2:
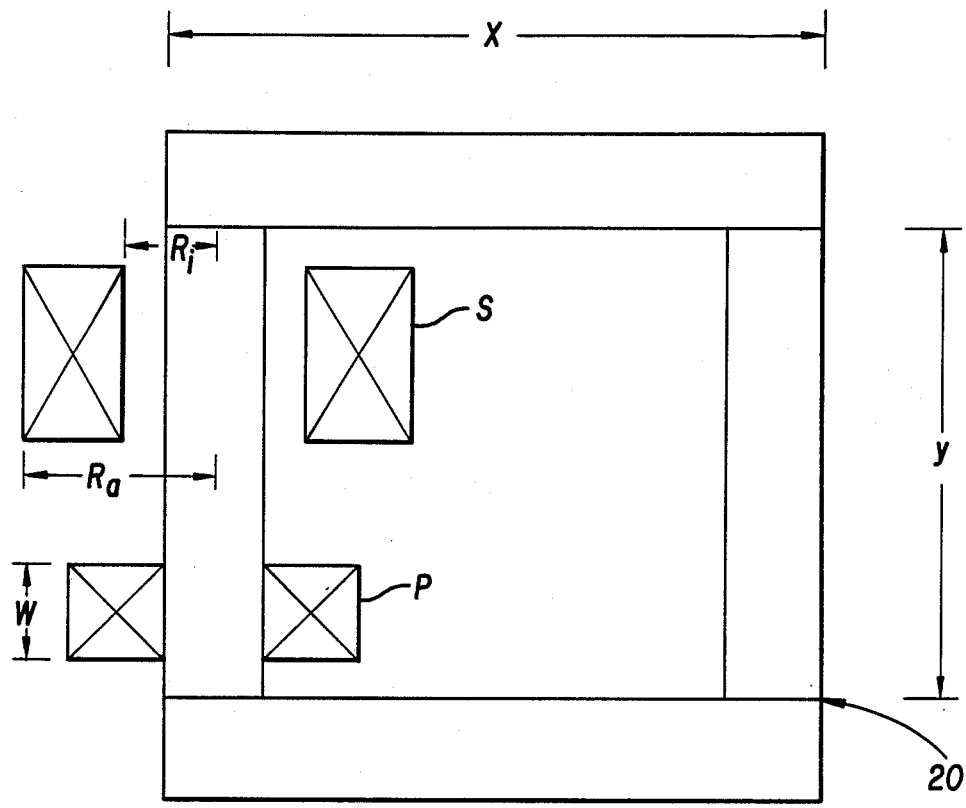
FIG. 2 is a side view of the transformer illustrating core and winding dimensions.

In particular, there is a critical ratio between the winding breadth W of the primary coils stand and the limb length Y of the iron core as shown in FIG. 2. According to the present invention, a ratio of 1:5 is preferred but the ratio can also lie in the range of from 1:4 to 1:6.

In the case of "hard" high voltage transformers, the shortest possible yokes are used. In the case of the high voltage transformers according to the present invention, ratios of yoke length X to limb length Y of 1:1 to 2:1 are preferred.

Another important factor shown in FIG. 2 is the average diameter of the secondary windings. It is given by $R_i:R_a=1:2$, wherein $R_i$ is half of the inner diameter of the secondary winding and $R_a$ is half of the outer diameter of the secondary winding. The effective measures hereby conform to the voltages to be insulated.

In practice, the success of this arrangement is manifested by the fact that, in the case of the appearance of a high voltage spark-over in the consuming device, the secondary current increases and the secondary voltage drops.

The spark-over is thereby automatically extinguished and the interruption of the electron emission lasts only a few milliseconds.

As a protection for the secondary side of the transformer in the case of sudden failure of the load, for example cathode break, in the output side of the measurement resistance, a rapidly reacting varistor chain is introduced in parallel.

In addition to the already mentioned protective measures, for an industrial, fully automatic operation of a high voltage apparatus with electron stream producer, adjustable switch-off delays for "long" lasting excess currents and overvoltages are present.

For bringing the electron stream producer into operation, "softening" means are necessary in addition to the transformer. For this purpose, in the primary supply lines of the high voltage apparatus there are introduced impedance coils of relatively high inductivity and small capacity. They are to limit the maximum electron stream to a few mA during the time of the activation of the electron stream producer.

The impedances can only be switched on or off at the zero position of the variable ratio transformer.

The following Example is given for the purpose of illustrating the present invention:

EXAMPLE

A high voltage transformer produced according to the present invention of 220 keV with a test voltage of 330 keV and an internal resistance of 640 kOhm, the main constructional elements of which have the following dimensions:

| | |
|---|---|
| winding breadth w of the primary coil | 153 mm. |
| limb length y of the iron core | 590 mm. |
| yoke length x of the iron core | 765 mm. |
| half inner diameter $R_i$ of the secondary coil | 110 mm. |
| half outer diameter $R_a$ of the secondary coil | 220 mm. | is placed, as can be seen from FIG. 1 of the accompanying drawings, in a high voltage plant for an electron accelerator for lacquer hardening with the help of accelerated electrons on synthetic resin push rods. The electron radiator has the following technical data:

| | |
|---|---|
| accelerating voltage | 220 keV |
| electron stream | 120 mA |
| scanner length | 1300 mm. |
| irradiated parts | 300 pieces/hour. |

In FIG. 1, the reference numerals have the following meanings:
1 fine control element
2 impedance coils
3 switches for switching on and off of the impedances
4 transformer
5 rectifier
6 protective resistor
7 varistors
8 resistance for measurement purposes
9 electron stream measurement
10 gauge and time-lag switch
11 current supply of the electron stream producer
12 electron accelerator For the energy supply of the electron stream producer, the high voltage apparatus is, furthermore, constructed as follows:

| | |
|---|---|
| series choke coils for the activation of the electron stream producer varistor protective circuitry | 0.15 Hy | current use at 240 keV and switching off thereof switch-off delay of current and voltage variably adjustable between 20 and 100 msec.

We claim:

1. High voltage transformer consisting essentially of a magnetic iron core, yokes and primary and secondary coils, with high voltage rectifier and fine control element for the energy supply of single and multistage electron accelerators, wherein the primary coil is such a distance from the secondary coil that a large stray field results, the ratios of yoke to limb lengths being from 1:1 to 2:1.

2. Transformer according to claim 1, wherein the ratio of the winding breadth of the primary coil to the limb length of the iron core is from 1:4 to 1:6.

3. Transformer according to claim 2, wherein the ratio of the winding breadth of the primary coil to the limb length of the iron core is 1:5.

4. Transformer according to any of the preceding claims, wherein the ratio $R_i:R_a$ is 1:2, $R_i$ being half the inner diameter of the secondary winding and $R_a$ being half the outer diameter of the secondary winding.

* * * * *